United States Patent [19]

Hollis, Jr.

[11] 3,738,613

[45] June 12, 1973

[54] JACK CONSTRUCTION FOR TRAILERS AND THE LIKE

[75] Inventor: Russell E. Hollis, Jr., Xenia, Ohio

[73] Assignee: General Processing Corporation, Crossville, Tenn.

[22] Filed: Dec. 30, 1970

[21] Appl. No.: 102,836

[52] U.S. Cl. .................. 254/86 R, 254/98
[51] Int. Cl. .............. B60s 9/02, B66f 3/08
[58] Field of Search .............. 254/86, 86 R, 98; 29/155 C

[56] References Cited
UNITED STATES PATENTS

| 2,638,315 | 5/1953 | Wagner | 254/86 R |
| 2,742,946 | 4/1956 | McGrann | 29/155 C |
| 3,529,337 | 9/1970 | Pfaff | 29/155 C |
| 2,352,117 | 6/1944 | Pasternack | 254/98 |

Primary Examiner—Othell M. Simpson
Attorney—Price, Heneveld, Huizenga & Cooper

[57] ABSTRACT

A jack construction having a telescoping inner tubular element guided for longitudinal movement with respect to an outer tubular element wherein the inner element is characterized by two telescoped and closely interfitting tubes of relatively thin-walled construction, such as ordinary hot-rolled, seam welded tubes, secured to one another.

8 Claims, 9 Drawing Figures

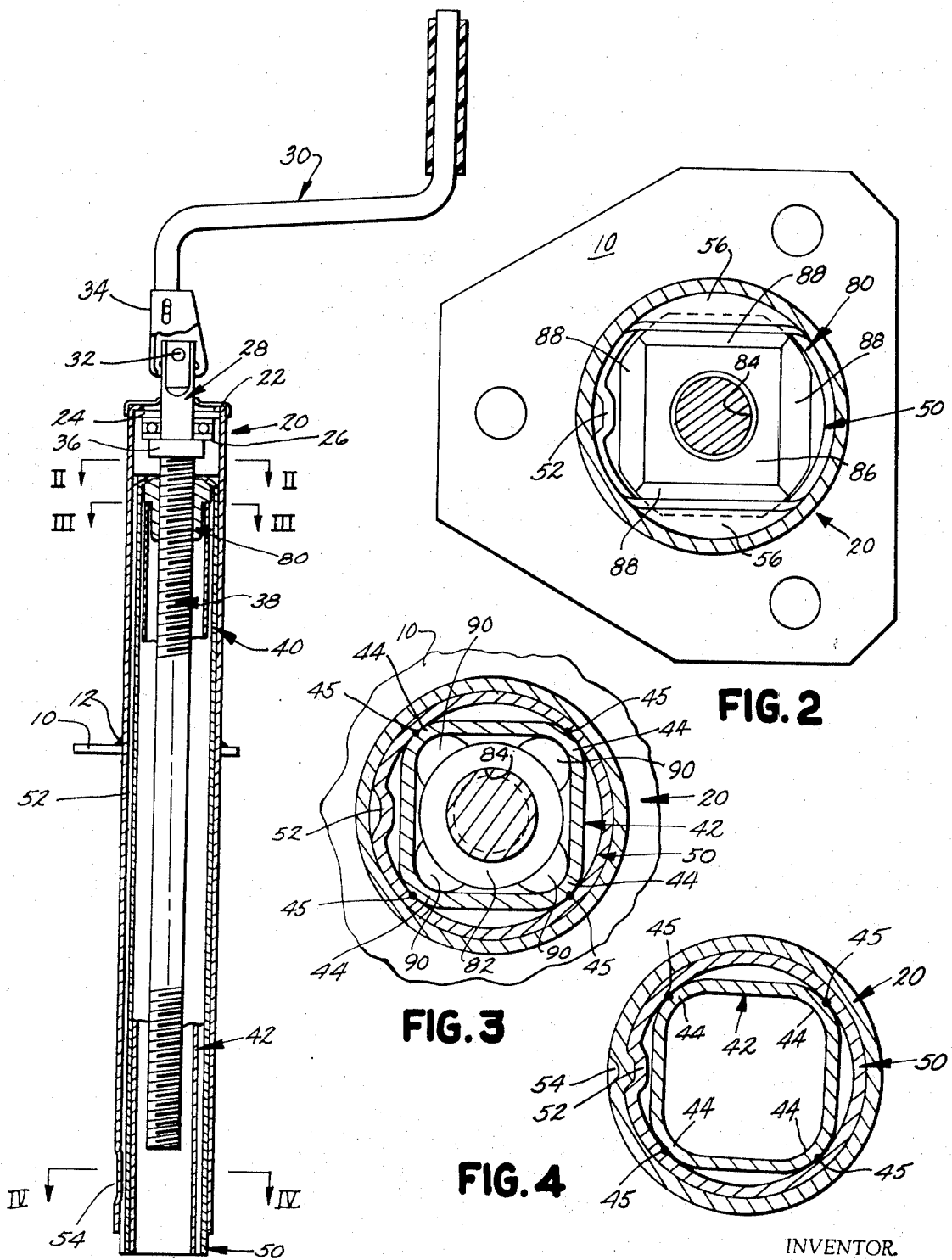

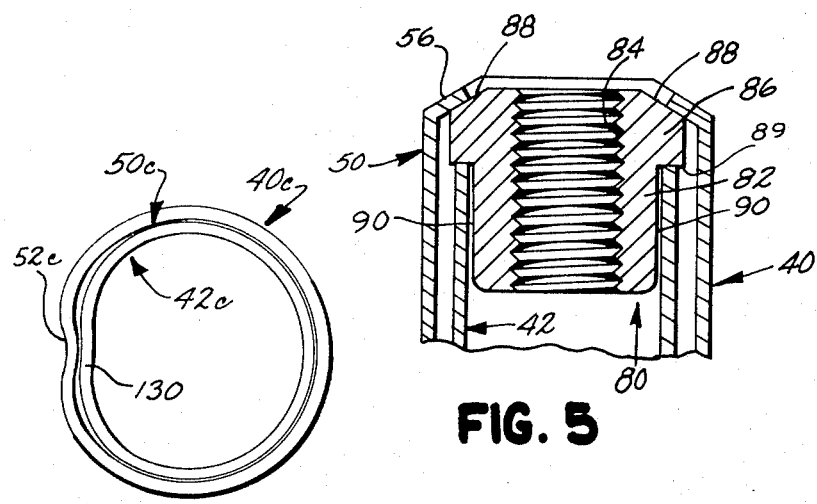
FIG. 8.
FIG. 5
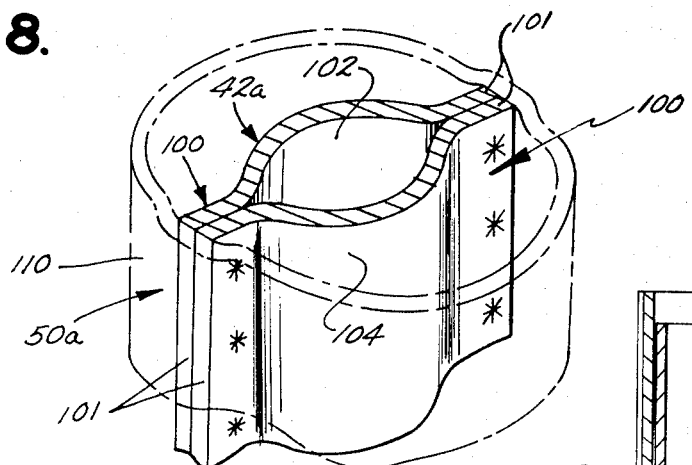
FIG. 6
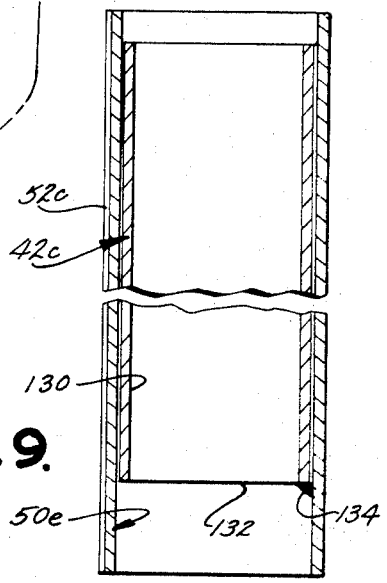
FIG. 9.
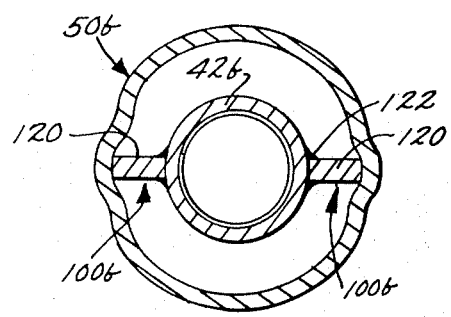
FIG. 7

JACK CONSTRUCTION FOR TRAILERS AND THE LIKE

BACKGROUND OF THE INVENTION

Trailers, mobile homes, and the like require jacks to support the front end of the trailer when it is disconnected from the towing vehicle. These jacks, which are commonly attached to the draw-bar or tongue of the trailer, must be designed to withstand great compressive loads, and they also must withstand sizeable bending moments, occurring when the trailer rolls slightly, against the jack. Accordingly, it has become customary to construct such jacks with a support column comprised of an outer tube and an inner tube, the tubes telescoping and advancing or retracting with respect to each other under the operation of a jack screw. The inner tube is confined against rotation relative to the outer tube, so as to move only axially with respect to the latter, thereby causing the rotational motion of the jack screw to advance or retract the inner tube.

Because of the aforementioned stresses placed upon the jack, it has been customary to construct the inner tube out of relatively thick-walled cold rolled seamless drawn tubes for strength purposes. Such tubing is a relatively expensive commodity compared to other more common tubing, and it will be readily recognized that its use contributes significantly to the cost of conventional jacks. A further disadvantage of prior art constructions has been that, paraodoxically, after forming the tube from expensive seamless tubing stock, it has been the practice to cut a recess longitudinally in the wall of the inner tube, for the purpose of slideably-receiving an element fixed to the outer tube, to prevent the inner tube from rotating with respect to the outer tube. Such a recess in the inner tube weakens this member, which otherwise was deliberately manufactured from an expensive material selected for its strength. Yet another problem of such conventional jacks has been the relatively close tolerance requirements for the interfitting tubular parts, which requirements have also contributed significantly to the cost of the apparatus.

SUMMARY OF THE INVENTION

The invention relates particularly to an improved jack of telescoping tubular construction, which utilizes a supportive element made from relatively thin and inexpensive material, in contrast with the conventional use of expensive, heavy-walled, seamless tubing, as has heretofore been utilized. Thus, the invention provides a supportive column member particularly useable in jacks but also useful in many applications which is both stronger and less expensive than those known and used previously. In known jacks, there is an outer element and an inner element, and means for extending one of the elements lengthwise with respect to the other. The improvement provided by the invention comprises forming the inner element of two or more thin-walled tubes telescope and secured together, with the tubes being, for example, inexpensive members formed of seam-welded rolled metal, each of which may be considerably thinner in wall section than the single member found in conventional structures, and thinner than the outer element. The novel inner element so comprised is quickly and inexpensively assembled, by merely telescoping together a pair of thin tubes and fixing at least a portion of each tube to at least a portion of the adjacent telescoped tube. Tolerance difficulties (i.e., the requirement of close tolerances needed for proper telescoping and structural integrity) are avoided in this process, and other advantages made available, by further including the step of upsetting or deforming one of the tubes from its normal circular cross section into a non-circular shape which will readily telescope with the other tube, preferable with a close frictional fit.

Accordingly, it is a major object of the invention to provide an improved jack having greater bending and columnar strength, and a process for making the same, wherein the inner structural column of the jack is produced much less expensively than, and provides greater strength than, structures heretofore available in conventional jacks.

A further important object of the invention is to provide such a jack and such a process wherein the structure and the steps of manufacturing substantially reduce the tolerance requirements, to further reduce the expenses involved in manufacture.

Additional objects, and the many advantages provided by the invention, will become apparent upon reference to the attached drawings and the following more detailed discussion.

BRIEF DESCRIPTION OF THE DRAWINGS

FIG. 1 is a fragmentary elevational view, partly in central vertical section, of a jack construction in accordance with the invention;

FIG. 2 is an enlarged sectional plan view taken along the plane II—II of FIG. 1;

FIG. 3 is a fragmentary enlarged sectional plan view taken along the plane III—III of FIG. 1;

FIG. 4 is an enlarged sectional plan view taken along the plane IV—IV of FIG. 1;

FIG. 5 is an enlarged elevational view in central section of the upper end of the two tubes comprising the inner element of the jack;

FIG. 6 is an enlarged, fragmentary perspective view showing a portion of a different embodiment of the inner element;

FIG. 7 is a sectional plan view of another different embodiment of the inner element;

FIG. 8 is a sectional plan view of yet another different embodiment of the inner element; and FIG. 9 is a longitudinal sectional side elevation of the embodiment shown in FIG. 8.

DESCRIPTION OF THE PREFERRED EMBODIMENT

The present invention relates broadly to an improvement in tubular structural columns, and more particularly it relates to the use of such a column member in a jack, particularly a jack of the type which is mounted on a mobile structure such as a trailer or the like, and which supports an end of the latter in a stationary fashion. Such a jack must be designed to sustain considerable vertical loading, as it normally is the sole support for the tongue end of the trailer. Referring to FIGS. 1 and 2, the type of jack under discussion has a fixed plate 10 secured thereto, as by a weld 12, with the plate 10 then being bolted or otherwise attached to the coupler body or tongue of the trailer, to attach the jack to the latter. Such a plate is conventional, as is an outer tubular element 20 and a telescoped inner element 40. The outer element 20 is crimped over at its upper end 22, with a thrust plate 24 mounted under the crimped end 22. A thrust bearing 26 is disposed beneath thrust plate 24, and the upper shank 28 of a jack screw 38 extends upwardly through the thrust bearing. A handle assembly 30 is pivotally mounted in a well-known manner about a horizontal pin 32 passing through the shank of the jack screw, as by a bracket 34. The thrust bearing 26 is confined between the thrust plate 24 and a heavy rigid shoulder 36 on the shank 28 of the jack screw. The entire lower portion of the jack screw beneath its shank 28 is threaded along its length and engages a follower nut 80, for linear reciprocation of the inner element 40 of the jack within the outer element 20, in a manner hereinafter described. Because of the fixed attachment of the plate 10 to the outer member 20, the outer element 20 in effect becomes part of the mobile home or like structure.

In accordance with the invention, the inner element 40 of the jack comprises a pair of mutually telescoped members. In one embodiment of the invention, the latter members are thin-walled tubes 42 and 50 (FIGS. 1-5), which are telescoped together and welded to each other. The innermost tube 42 may be comprised of a hot-rolled, seam-welded tube which has been squared to provide rounded corners 44, as by an upsetting or stamping operation which shapes a generally cylindrical tube into a somewhat rectangular or squared tube, as shown in FIG. 3. Prior to this stamping operation, the outside diameter of tube 42 is somewhat less than that of tube 50, but the stamping operation displaces the sides of tube 42 inwardly to form the illustrated flat portions and in this manner the diameter across the corners 44 of the stamped tube 42 is extended so as to approximately match the inner diameter of tube 50. Because of this stamping operation, tolerances need not be carefully controlled when the tube 42 is initially rolled, since the stamping operation can readily produce the required size for the squared tube, regardless of even relatively wide tolerance variations in the rolled cylindrical tube which is used. It is at the corners 44 of squared tube 42, which contact the tube 50, that the two tubes are joined together, preferably by welding as at 45. The welded portions 45 can be located anywhere along the length of the tubes 42 and 50, and it should be noted that this welding is primarily intended merely to keep the two tubes together, and not for load-carrying purposes. The tube 50 comprises the outermost tube of the inner element 40, and it preferably extends above the tube 42 telescoped into it (FIG. 1). The tube 50 may also be a hot-rolled, seam welded tube, and it is generally circular in cross section, except for a longitudinal deformation 52 which extends the full length of this tube. Specifically, the deformation 52 comprises an inward crimp in the wall of tube 50, which crimp however does not cause a break or a perforation in the surface of the tube, thereby maintaining (and in fact increasing) the axial compressive strength of the tube. The deformation 52 has a depth dimension which cooperates with a mating longitudinal guideway or boss 54 (FIGS. 1 and 4) formed in the bottom of the outer tubular element 20. The interengagement between the guideway 54 and the deformation 52 restrains the inner element 40 from rotating with respect to the outer element 20, thereby ensuring that the inner element 40 will only move longitudinally upwardly or downwardly within outer element 20 upon rotation of the jack screw 38. In this connection, it should be appreciated that a small clearance should be provided between the inner and outer elements to promote smooth sliding movement therebetween, even though this clearance, being relatively small, is not specifically shown in the figures.

Referring now to FIGS. 1, 2, and 5 the upper edges 56 of the outer tube 50 which extend above the upper end of the inner tube 42, are crimped or bent over at two sides to fit flush against the top of the follower nut 80. Referring also to FIG. 3, the follower nut comprises a body portion 82 with a threaded hole 84 extending axially therethrough. The body 82 is topped by a head 86 having beveled sides 88, against two of which rest the crimped edges 56 of tube 50. The follower nut body also has four projections 90 which extend from and form corner portions of the body, for alignment within the corners 44 of the inner tube 42. The bottom of head 86 defines a flat shoulder 89, which seats upon the top of the inner tube 42 to transfer loading to this tube at this point.

It will be readily appreciated that the above-described jack assembly, and in particular, the inner element 40 thereof comprising the two tubes welded together and having no perforation through the walls thereof, can withstand great vertical loads. Furthermore, and of significant advantage to this particular construction, the use of two such tubes allows each to be formed as thin-walled tubes by hot-rolling and seam-welding, a process which is considerably less expensive than the process of drawing seamless tubes. A representative thickness of the thin gauge which is thus possible is 0.10 inches. Finally, by upsetting the tube 42 so as to make the same contact the inner surface of the outer tube 50 only at four edges, the tolerance problem is greatly reduced, and in fact substantially eliminated, from what it would be otherwise if tube 42 were designed to be in contact with the outer tube 50 along its entire circumference.

After the two tubes 42 and 50 are initially formed as generally cylindrical hot-rolled, seam-welded tubes, the process of manufacturing the apparatus of the invention proceeds, in a manner which will now be discussed. The cylindrical tube 42 is upset by stamping it in a die or jig, so as to form it into the generally rectangulated or squared configuration shown in FIGS. 3 and 4. The stamping is done so that the maximum diameter or dimension across the rounded corners of the rectangular tube 42 approximately matches the inside diameter of the exterior or outer tube 50. The two tubes are then telescoped together and thereafter fixed one to the other, at one or more positions or portions of the outer surface of the inner tube 42 and at registering positions or portions of the inner surface of the outer tube 50. Such fixing is preferably accomplished by welding, such as by spot-welding. The follower nut 80 is then inserted into the upper end of the inner tube 42, with the shoulder 89 of the follower nut on top of the tube 42, and the edges 56 of the tube 50 are then crimped over on top of the beveled portions 88 of the nut. The follower nut acts as a thrust element to transfer the vertical loads from the jack screw 38 to the inner element 40. The longitudinal deformation comprising the guideway 52 in outer tube 50 can be formed by stamping the latter, and this is preferably done prior to the telescoping of the two tubes, but it can also be done after the telescoping step.

ALTERNATE EMBODIMENTS

FIGS. 6 and 7 illustrate certain alternate embodiments for the inner element 40, wherein the telescoped members comprising the latter are shaped differently from the embodiment already described. Parts similar to those previously described bear the same reference numeral, to which distinguishing suffixes a and b are attached. Thus, FIG. 6 illustrates an inner tube 42a and an outer tube 50a telescoped together. The inner tube 42a is characterized by two broad U-shaped flanges 100 which are placed back-to-back and welded together at their edges 101, so that the curving central channel portions 102 and 104 thereof together define a hollow tubular extremity. The outer tube 50a is, accordingly, shaped so as to be generally cylindrical except for two laterally protruding ridge-like portions 110 which extend outwardly from the outer surface of the tube 50a the full length thereof. It will be readily appreciated that the ridge-like portions 110 provide two functions. The first is to define a space which accommodates the joined edges 101 of the flanges 100, to prevent the tube 42a from rotating with respect to the tube 50a. The second is to provide a longitudinal guideway or indexing portion which cooperates with the outer tubular element 20. That is, the outer element 20 in this embodiment should be provided with a similar complementary guideway portion which closely but slideably receives the portion 110, so as to prevent rotation between the composite inner element 40 and the outer element 20.

Referring to FIG. 7, the inner tube 42b has side flanges 100b similar to those shown in the embodiment in FIG. 6 except that the tube 42b has a single central tube, (which may be of hot-rolled seam-welded construction), with the side flanges 100b comprising narrow strip-like plates 120 which are welded at 122 to the outside of the central tube 42b. The outer tube 50b may generally be the same as that shown at 50a in the embodiment in FIG. 6.

FIGS. 8 and 9 illustrate yet another embodiment of the inner structural tubular element 40, wherein the two tubes forming such inner element take yet another shape. Parts similar to those previously described bear the same reference numeral, to which the distinguishing suffix c has been added. Thus, the inner structural element 40c comprises an inner tube 42c and an outer tube 50c, both of which may be thin tubing of the hot-rolled and seam-welded variety, as in the previous embodiments. The two tubes 42c and 50c are similar to the embodiments shown in FIGS. 1 through 5, in that the outermost tube, i.e., tube 50c has a longitudinal deformation 52c formed therein as an inward crimp in the tube. The tolerance problem is again readily solved, since the design allows for considerable spacing between the outer surface of the inner tube 42c and the inner surface of the outer tube 50c. However, this embodiment differs from those described above, in that the elongated deformation 52c is preferably formed by stamping, the entire telescoped tubular arrangement, with the stamping operation causing the inner tube 42c to flatten out somewhat at the side 130 thereof, in registration with and adjacent the crimped deformation 52c. Also, the inner tube 42c is not squared off as in the previous embodiment, inasmuch as such squaring is not an absolute requirement in and of itself, so long as the shaping precludes relative rotation and, preferably, so long as the longitudinal deformation technique is availed of to add strength to the inner tube member. Both of these considerations are satisfied in the embodiment under discussion, in a very simple and effective manner. As in the previous embodiments, the two tubes 42c and 50c are fixed together, for example at the bottom 132 of the inner tube 42c, where the two tubes are tack-welded together at 134 (FIG. 9).

It is entirely conceivable that upon examining the foregoing disclosure, those skilled in the art may devise embodiments of the concept involved which differ somewhat from the embodiment shown and described herein, or may make various changes in structural details to the present embodiment. Consequently, all such changed embodiments or variations in structure as utilize the concepts of the invention and clearly incorporate the spirit thereof are to be considered as within the scope of the claims appended herebelow, unless these claims by their language specifically state otherwise.

The embodiments of the invention in which an exclusive property or privilege is claimed are defined as follows.

1. In a lengthwise-extendable jack member of the type having an outer element telescoped over an inner element and means for moving one of said elements along the length of the other, the improvement wherein said inner element comprises a pair of tube-like members telescoped one over the other and means securing said two members together, including indexing means for preventing relative rotation between said two tube-like members, said indexing means including side wall portions of each of said tube-like members defining mutually interfitting and rotationally interfering structures, and the innermost one of said tube-like members having a side wall portion which is generally flattened and which extends along a substantial portion of the length of said member.

2. In a lengthwise-extendable jack member of the type having an outer element telescoped over an inner element and means for moving one of said elements along the length of the other, the improvement wherein said inner element comprises a pair of tube-like members telescoped one over the other and means securing said two members together, including indexing means for preventing relative rotation between said two tube-like members, said indexing means including side wall portions of each of said tube-like members defining mutually interfitting and rotationally interfering structures, the said side wall portion of the outermost one of said tube-like members defining a longitudinal deformation in the wall of such member which provides a longitudinal guideway thereon, and said outer jack element including a portion projecting slideably into said guideway to guide said lengthwise movement of said inner and outer elements and prevent relative rotation therebetween.

3. The improvement defined in claim 2, wherein said deformation is an inward crimp in the wall of said tube-like member which extends along a substantial portion of length of said outer tube.

4. In a lengthwise-extendable jack member of the type having an outer element telescoped over an inner element and means for moving one of said elements along the length of the other, the improvement wherein said inner element comprises a pair of tube-like members telescoped one over the other and means securing said two members together, including indexing means for preventing relative rotation between said two tube-like members, said indexing means including side wall portions of each of said tube-like members defining mutually interfitting and rotationally interfering structures, the said side wall portion of the outermost one of said tube-like members defining a longitudinal deformation in the wall of such member which provides a longitudinal guideway thereon, and said side wall portion of said innermost tube-like member defining a laterally raised ridge-like portion extending along a substantial part of the length of such member.

5. The improvement defined in claim 4, wherein said laterally raised ridge-like portion comprises a longitudinal flange fixed to and extending from a side of said member.

6. The improvement defined in claim 4, wherein said innermost tube-like member comprises a pair of generally channel-shaped strips each of which has flanged edges, said strips being secured together along their respective flanges in back-to-back relation to form a laterally flanged tubular member.

7. In a lengthwise-extendable jack member of the type having an outer element telescoped over an inner element and means for moving one of said elements along the length of the other, the improvement wherein said inner element comprises a pair of tube-like members telescoped one over the other and means securing said two members together, and wherein the innermost one of said tube-like members is formed with a generally polygonal cross section having corner portions spaced sufficiently apart to cause such corners to contact the interior of the outermost tube-like member.

8. In a lengthwise-extendable jack member of the type having an outer element telescoped over an inner element and means for moving one of said elements along the length of the other, the improvement wherein said inner element comprises at least one relatively thin-walled tube having a circumferential wall defining undulations extending ridge-like and groove-like along the length of such tube, and wherein said outer jack element includes a portion projecting slideably into one of said groove-like undulations as a guideway to guide said lengthwise movement of said inner and outer elements and prevent relative rotation therebetween.

* * * * *